(12) United States Patent
Kuo et al.

(10) Patent No.: US 10,884,215 B2
(45) Date of Patent: Jan. 5, 2021

(54) LENS DRIVING DEVICE, CAMERA DEVICE, AND ELECTRONIC APPARATUS

(71) Applicant: New Shicoh Technology Co., Ltd., Kanagawa (JP)

(72) Inventors: Li-Te Kuo, Tainan (TW); Ying-Chi Cho, Tainan (TW)

(73) Assignee: New Shicoh Technology Co., Ltd., Kanagawa (JP)

(*) Notice: Subject to any disclaimer, the term of this patent is extended or adjusted under 35 U.S.C. 154(b) by 439 days.

(21) Appl. No.: 15/279,591

(22) Filed: Sep. 29, 2016

(65) Prior Publication Data

US 2017/0108660 A1    Apr. 20, 2017

(30) Foreign Application Priority Data

Oct. 14, 2015   (JP) ................................. 2015-202586

(51) Int. Cl.
*G02B 7/08*     (2006.01)
*G02B 27/64*    (2006.01)

(52) U.S. Cl.
CPC ............. *G02B 7/08* (2013.01); *G02B 27/646* (2013.01)

(58) Field of Classification Search
CPC ................................ G02B 7/08; G02B 27/646
USPC ......................................................... 359/824
See application file for complete search history.

(56) References Cited

U.S. PATENT DOCUMENTS

2014/0146406 A1\* 5/2014 Lee .......................... G02B 7/08
                                                                 359/824
2016/0241787 A1   8/2016 Sekimoto

FOREIGN PATENT DOCUMENTS

| CN | 204086644 U | 1/2015 |
| JP | 2009-271204 | 11/2009 |
| JP | 2012-093558 | 5/2012 |
| JP | 2014-021397 | 2/2014 |
| WO | 2015/045527 | 4/2015 |

OTHER PUBLICATIONS

Office Action issued in corresponding Japanese Patent Application No. 2015-202586, dated Jul. 19, 2018, and English translation.
(Continued)

*Primary Examiner* — Thomas K Pham
*Assistant Examiner* — Mitchell T Oestreich
(74) *Attorney, Agent, or Firm* — Fildes & Outland, P.C.

(57) ABSTRACT

Provided are a lens driving device, a camera device, and an electronic apparatus that are capable of smoothly guiding a lens support. A lens driving device (10) includes a lens support (22) configured to support a lens, a frame member (30) surrounding a periphery of the lens support (22), and a plurality of guiding mechanisms (52a to 52a) configured to guide the lens support (22) relative to the frame member (30) in a freely movable manner. Each of the plurality of guiding mechanisms (52a to 52d) includes a first guiding portion (62a to 62d) formed in the frame member (30), a second guiding portion (64a to 64d) formed in the lens support (22), and balls (24a to 24d) arranged between the first guiding portion (62a to 62d) and the second guiding portion (64a to 64d). The first guiding portion (62b) is formed with use of a first frame member (30a) and a second frame member (30b) that are separate members.

13 Claims, 8 Drawing Sheets

(56) References Cited

OTHER PUBLICATIONS

English language abstract and machine translation of JP 2014-021397.
English language abstract and machine translation of JP 2009-271204.
English language abstract of JP 2012-093558.
Office Action issued in corresponding Chinese Patent Application No. 201610417467.5, dated Dec. 19, 2018, and English translation.
English language translation of CN 204086644U.

* cited by examiner

LENS DRIVING DEVICE, CAMERA DEVICE, AND ELECTRONIC APPARATUS

BACKGROUND OF THE INVENTION

1. Field of the Invention

The present invention relates to a lens driving device, a camera device, and an electronic apparatus.

2. Description of the Related Art

A small-sized camera is mounted on an electronic apparatus, e.g., a mobile phone or a smart phone. As this type of small-sized camera, for example, as disclosed in Japanese Patent Application Laid-open No. 2012-93553, there is known a small-sized camera having an auto-focus function and an image stabilization function.

In Japanese Patent Application Laid-open No. 2012-93558, the camera includes a lens support configured to support a lens, and a frame member surrounding a periphery of the lens support. In order to support the lens support relative to the frame member in a freely movable manner, a plurality of balls are used.

However, it is difficult to appropriately secure the intervals among the lens support, the frame member, and the balls, and there have been problems of unsmooth movement of the lens support and occurrence of rattle in some cases.

SUMMARY OF THE INVENTION

The present invention has been made to solve the above-mentioned related-art problems, and has an object to provide a lens driving device, a camera device, and an electronic apparatus that are capable of smoothly guiding a lens support.

According to one embodiment of the present invention, there is provided a lens driving device, including: a lens support configured to support a lens; a frame member surrounding a periphery of the lens support; and a plurality of guiding mechanisms configured to guide the lens support relative to the frame member in a freely movable manner in an optical axis direction of the lens, each of the plurality of guiding mechanisms including: a first guiding portion formed in the frame member; a second guiding portion formed in the lens support; and balls arranged between the first guiding portion and the second guiding portion, the first guiding portion being formed with use of a first frame member and a second frame member that are separate members and construct the frame member.

It is preferred that the plurality of guiding mechanisms include two guiding mechanisms formed on both sides of the lens support, and that the first guiding portion of each of the two guiding mechanisms includes an adjusting surface formed in the second frame member, for adjusting a position of the balls, and a regulating surface formed in the first frame member, for regulating the position of the balls in a direction intersecting with a direction of the adjusting.

Further, it is preferred that the plurality of guiding mechanisms are provided in four directions around the lens, that the first guiding portion of each of the plurality of guiding mechanisms are formed as a groove with intersecting planes, and that the second guiding portion is formed as a plane opposed to the first guiding portion.

According to another embodiment of the present invention, there is provided a lens driving device, including: a lens support configured to support a lens; a frame member surrounding a periphery of the lens support; and a plurality of guiding mechanisms configured to guide the lens support relative to the frame member in a freely movable manner, each of the plurality of guiding mechanisms including: a first guiding portion formed in the frame member; a second guiding portion formed in the lens support; and balls arranged between the first guiding portion and the second guiding portion, the frame member including a first frame member and a second frame member formed of separate members, the first frame member having a reference surface in one of the plurality of guiding mechanisms, the second frame member having an adjusting surface opposed to the reference surface, for adjusting an interval to the reference surface, in another one of the plurality of guiding mechanisms, the lens support being arranged between the reference surface and the adjusting surface through intermediation of the balls.

Further, it is preferred that the first guiding portion of the another one of the plurality of guiding mechanisms having the adjusting surface includes the adjusting surface and a first regulating surface for regulating a position of the balls of the another one of the plurality of guiding mechanisms in a direction orthogonal to a direction of the adjusting, that the second guiding portion of the another one of the plurality of guiding mechanisms having the adjusting surface includes a first buffering surface forming a predetermined angle with respect to the direction of the adjusting, that the second guiding portion of the one of the plurality of guiding mechanisms having the reference surface includes a second buffering surface forming a predetermined angle with respect to the direction of the adjusting, and that the first guiding portion of the one of the plurality of guiding mechanisms having the reference surface include the reference surface of the one of the plurality of guiding mechanisms and a second regulating surface for regulating a position of the balls in the direction orthogonal to the direction of the adjusting.

Further, it is preferred that the frame member includes a placing plane portion on which the second frame member is placed so that, the second frame member is slidable when the lens driving device is manufactured.

Further, it is preferred that the lens driving device further includes: a first magnet mounted to the frame member; a first coil mounted to the lens support so as to be opposed to the first magnet; and a pair of conductive wires that couples between the frame member and the lens support in a cantilever state and is configured to supply power to the first coil.

Further, it is preferred that the pair of conductive wires are formed line symmetric with respect to a lens diameter.

Further, it is preferred that the lens driving device further includes: a base configured to support the frame member in a freely movable manner in a direction orthogonal to an optical axis of the lens; a first magnet mounted to the frame member; a first coil mounted to the lens support so as to be opposed to the first magnet; a second magnet mounted to the frame member; and a second coil mounted to the base so as to be opposed to the second magnet, the second magnet has a width in the optical axis direction that is smaller than a width in the optical axis direction of the first magnet.

Further, it is preferred that the second coil includes a plurality of second coils, and that one of the plurality of second coils be opposed to the first magnet.

Further, it is preferred that the lens support includes a protruding portion outwardly protruding from an outer peripheral surface of the lens support, and that the protruding portion abuts against a receiving portion formed at a position higher than a position of a bottom portion of the frame member.

Further, it is preferred that the lens driving device further includes: a position detecting magnet mounted to the lens support; a position detector mounted to the frame member and configured to detect a position of the lens support in the optical axis direction; a second magnet mounted to the frame member; a second coil mounted so as to be opposed to the second magnet; and a yoke arranged between the position detector and the second magnet.

According to another embodiment of the present invention, there is provided a camera device, including: the lens driving device; a lens supported by the lens support; and an image sensor configured to receive light from the lens.

According to another embodiment of the present invention, there is provided an electronic apparatus, including the camera device.

According to the present invention, a configuration capable of adjusting the intervals among the lens support, the balls, and the frame member is obtained. Therefore, the intervals among the lens support, the balls, and the frame member can be appropriately secured, and the lens support can be smoothly guided.

DETAILED DESCRIPTION OF THE PREFERRED EMBODIMENTS

An embodiment of the present invention is described with reference to the drawings.

First, an outline of a lens driving device is described.

Figure 1:
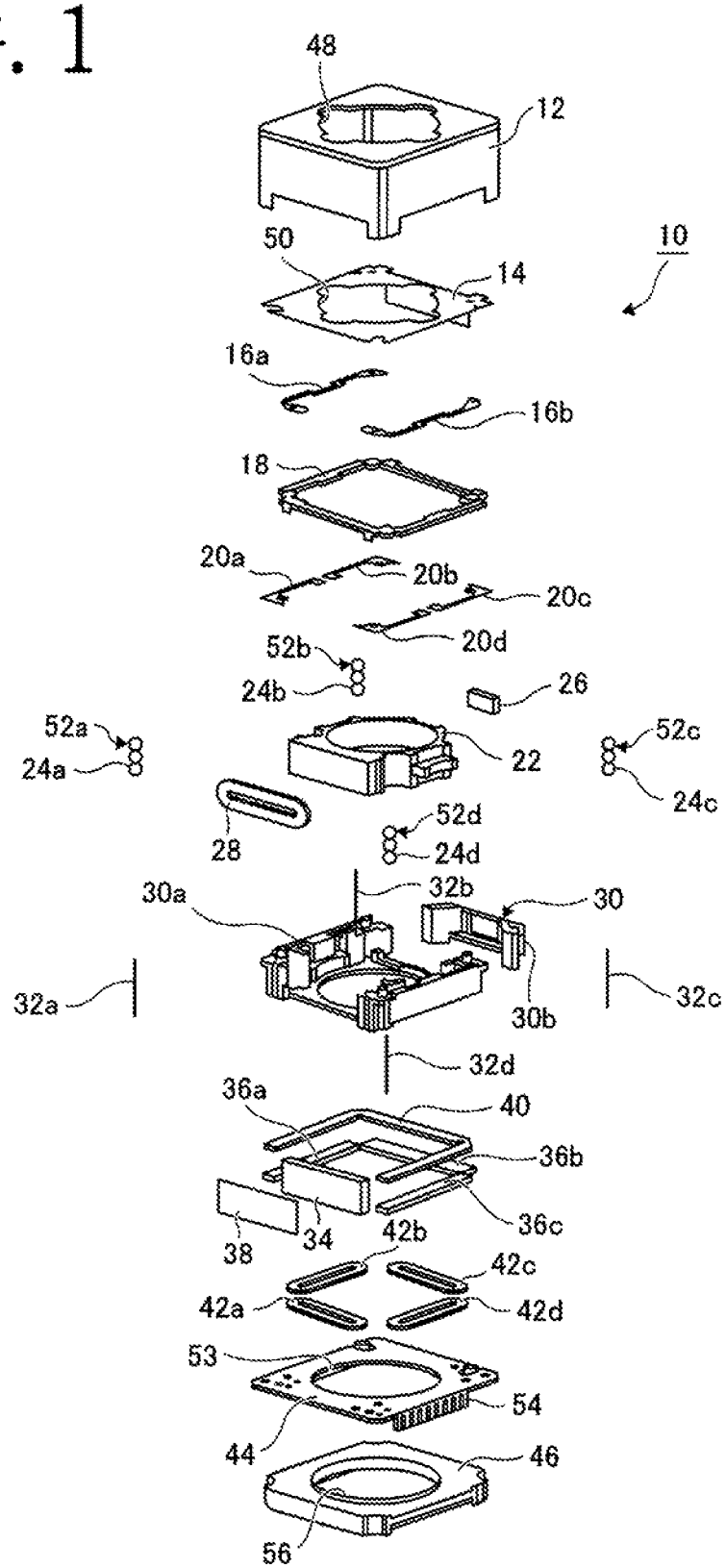
FIG. 1 is an exploded perspective view for illustrating a lens driving device according to an embodiment of the present invention.

FIG. 1 is an illustration of a lens driving device 10 according to a first embodiment of the present invention.

The lens driving device 10 includes a cover 12, an upper substrate 14, two leads (conductive wires) 16a and 16b, a platen (pressure plate) 18, four support springs 20a to 20d, a lens support 22, sets of balls 24a to 24d each formed of, for example, three balls, an optical axis direction position detecting magnet 26, a first coil 23, a frame member 30, four suspension wires 32a to 32d, a first magnet 34, three second magnets 36a to 36c, a first yoke 33, a second yoke 30, four second coils 42a to 42d, a lower substrate 44, and a base 46.

For the sake of convenience, one side of an optical axis direction of the lens driving device 10 is herein referred to as an upper side, and the other side thereof is herein referred to as a lower side.

The cover 12 is made of a non-magnetic material, e.g., stainless steel. The outer shape of the cover 12 is formed into a rectangular shape as viewed from above. The cover 12 has a circular first hole 48 formed therein, and light passes through the cover 12 via the first hole 48. The cover 12 and the base 46 mounted on the lower portion of the cover 12 cover the periphery of the lens driving device 10.

The outer shape of the upper substrate 14 is formed into a rectangular shape as viewed from above. The upper substrate 14 has a circular second hole 50 formed therein, and light passes through the upper substrate 14 via the second hole 50.

Each of the leads 16a and 16b has one end fixed so as to be sandwiched between the upper substrate 14 and the platen 18, and the other end fixed to the lens support 22. Further, the one end of each of the leads 16a and 16b is electrically connected to the upper substrate 14, and the other end thereof is connected to the first coil 28 such that power is supplied to the first coil 28 through the leads 16a and 16b.

Further, the platen 18 is formed as an insulating rectangular frame. The upper substrate 14 and the frame member 30 are fixed to the upper portion and the lower portion of the platen 18, respectively.

The support springs 20a to 20d each have one outer end that is fixed to the vicinity of an upper end of corresponding one of the suspension wires 32a to 32d so as to be electrically connected thereto, and the other inner end electrically connected to the upper substrate 14. Further, the support springs 20a to 20d are fixed so as to be sandwiched between the platen 18 and the frame member 30. The lower ends of the suspension wires 32a to 32d are fixed to the lower substrate 44 and are electrically connected thereto.

The lens support 22 is formed into a cylindrical shape, and has a thread or the like formed on an inner side thereof so as to support a lens. The first coil 28 is fixed to a part of an outer peripheral surface of the lens support 22, and the optical axis direction position detecting magnet 26 is fixed on an outer peripheral surface on the opposite side to the surface on which the first coil 23 is fixed.

The frame member 30 is arranged so as to surround the periphery of the lens support 22, and includes a first frame member 30a and a second frame member 30b.

The sets of balls 24a to 24d are arranged between the lens support 22 and the frame member 30, and construct guiding mechanisms 52a to 52d configured to guide the lens support 22 relative to the frame member 30 in a freely movable manner in the optical axis direction.

In the three balls of each of the sets of balls 24a to 24d, the center ball has a slightly smaller diameter than those of the upper and lower balls, and the two upper and lower balls substantially guide the lens support 22.

The first magnet 34 is formed into a flat plate shape, and is fixed to the first frame member 30a on the opposite side to the second frame member 30b across the lens support 22. Further, the first yoke 38 is fixed to the outer surface of the first magnet 34.

The second magnets 36a to 36c are fixed to three sides of the lower surface of the frame member 30 in the vicinity of the outer periphery thereof across the second yoke 40.

The second coils 42a to 42d are fixed to four sides of the upper surface of the lower substrate 44 in the vicinity of the outer periphery thereof. Three second coils 42b to 42d are opposed to the second magnets 36a to 36c, and one second coil 42a is opposed to the lower surface of the first magnet 34. Power is supplied to the second coils 42a to 42d from the lower substrate 44.

The outer shape of the lower substrate 44 is formed into a rectangular shape as viewed from above. The lower substrate 44 has a circular third hole 53 formed therein, and light passes through the lower substrate 44 via the third hole 53. The lower ends of the above-mentioned suspension wires 32a to 32d are fixed to the four corners of the lower substrate 44. Further, the lower substrate 44 includes an external connection terminal 54. The lower substrate 44 receives power from the external connection terminal 54, and inputs or outputs a signal through the external connection terminal 54.

The outer shape of the base 46 is formed into a rectangular shape as viewed from above. The base 46 has a circular fourth hole 56 formed therein, and light passes through the base 46 via the fourth hole 56. The lower substrate 44 is fixed to the upper surface of the base 46, and the cover 12 is fixed to the periphery of the base 46.

The upper substrate 14, the leads 16a and 16b, the platen 18, the support springs 20a to 20d, the lens support 22, the balls 24a to 24a, the optical axis direction position detecting magnet 26, the first coil 28, the frame member 30, the first magnet 34, the second magnets 36a to 36c, and the first yoke 38 described above construct one movable member. This movable member is suspended by the suspension wires 32a to 32d, and is supported in a freely movable manner in a direction orthogonal to the optical axis direction against elastic forces of the suspension wires 32a to 32d.

Further, the lens support 22, the optical axis direction position detecting magnet 26, and the first coil 28 construct one movable member. This movable member is guided in a freely movable manner in the optical axis direction through intermediation of the balls 24a to 24d.

Next, with reference to FIG. 2 to FIG. 8D, the lens driving device 10 according to the first embodiment of the present invention is further described in detail.

Figure 2:
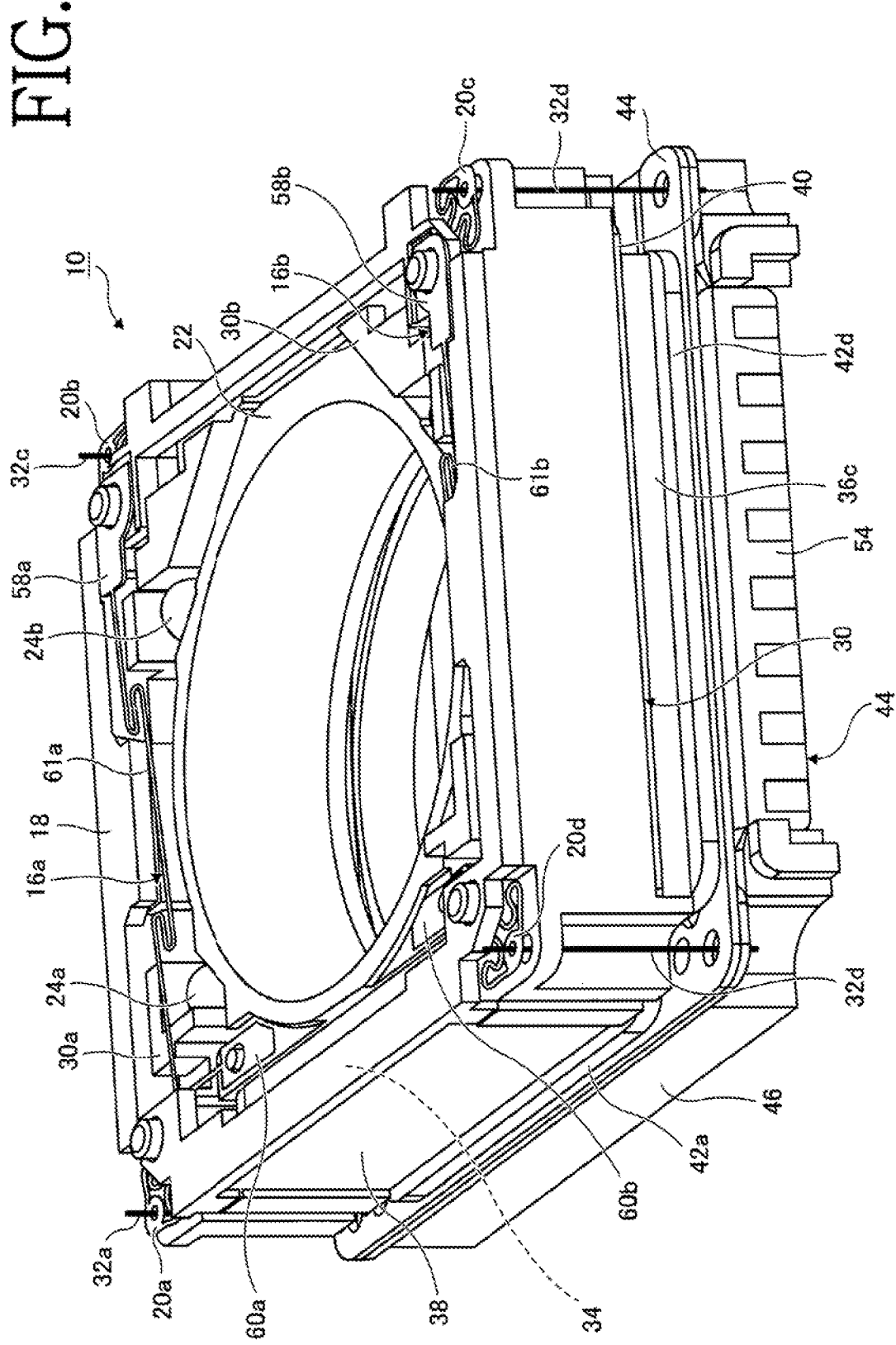
FIG. 2 is a perspective view for illustrating the lens driving device according to the embodiment of the present invention in which a cover and an upper substrate are omitted.

In this embodiment, each of the leads 16a and 16b is formed of a plate-like member. As illustrated in FIG. 2, the leads 16a and 16b respectively include first fixing portions 58a and 58b formed at ends on one side, and the first fixing portions 58a and 58b are fixed to the platen 18 (right ends in FIG. 2). Further, the leads 16a and 16b respectively include second fixing portions 60a and 60b formed at ends on the other side, and the second fixing portions 60a and 60b are fixed to the lens support 22 (left ends in FIG. 2). Further, the lead 16a includes a coupling portion 61a configured to couple the first fixing portion 58a and the second fixing portion 60a to each other, and the lead 16b includes a coupling portion 61b configured to couple the first fixing portion 58b and the second fixing portion 60b to each other. The coupling portions 61a and 61b each have S-shaped turned parts at two positions in the midway such that the coupling portions 61a and 61b are less liable to resist the movement of the lens support 22 in the optical axis direction. The leads 16a and 16b are line symmetric with respect to a diameter of the leads to be supported by the lens support 22.

That is, the leads 16a and 16b include the first fixing portions 58a and 58b and the second fixing portions 60a and 60b so as to couple between the platen 18 and the lens support 22 such that the lens support 22 is in a cantilever state with respect to the platen 18. The lens support 22 is coupled to the cantilever leads 16a and 16b, and hence the lens support 22 can be freely moved in the optical axis direction on the second fixing portion (60a, 60b) side. Meanwhile, the first magnet 34 is arranged on the side on which the second fixing portions 60a and 60b are arranged, and hence the lens support 22 can be moved in the optical axis direction with a small electromagnetic force.

Figure 3:
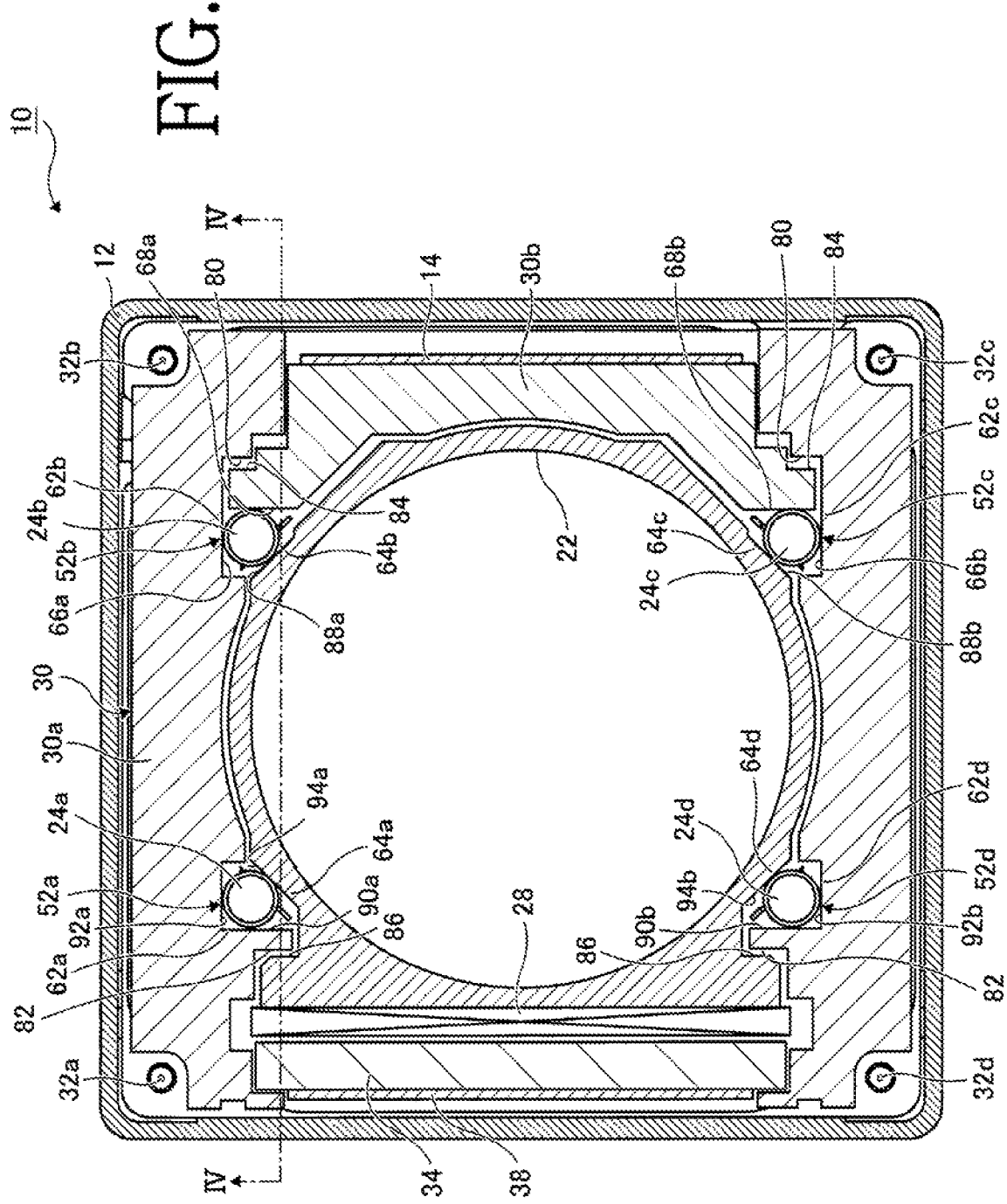
FIG. 3 is a sectional view taken along the line III-III of FIG. 4 for illustrating the lens driving device according to the embodiment of the present invention.
Figure 5:
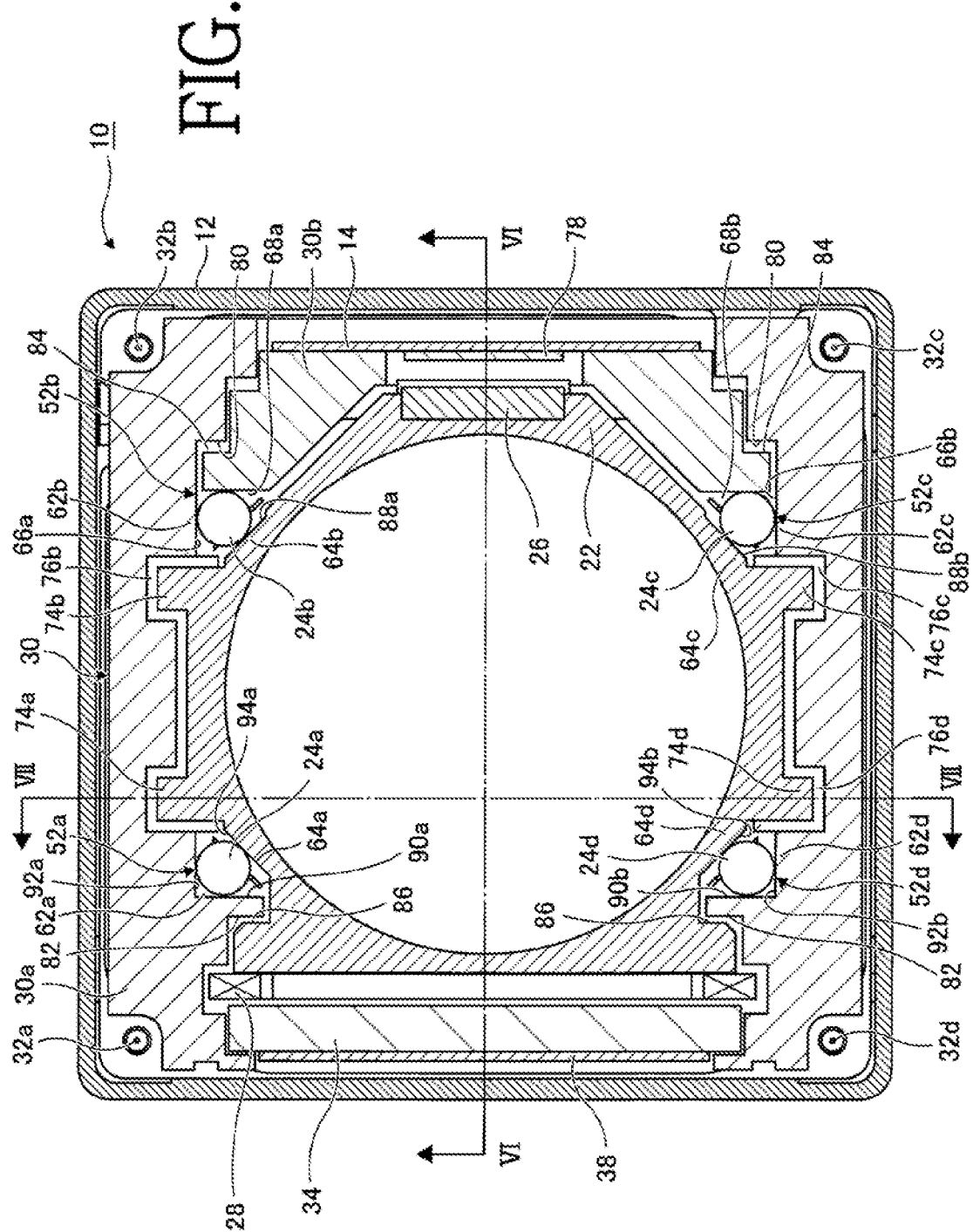
FIG. 5 is a sectional view taken along the line V-V of FIG. 4 for illustrating the lens driving device according to the embodiment of the present invention.

As illustrated in FIG. 3 and FIG. 5, the guiding mechanisms 52a to 52d are provided in four directions around the lens. The guiding mechanisms 52a to 52d include first guiding portions 62a to 62d formed in the frame member 30, second guiding portions 64a to 64d formed in the lens support 22, and the above-mentioned balls 24a to 24d, respectively. As described later, when the lens driving device 10 is manufactured, the second frame member 30b pushes the balls 24a to 24d and the lens support 22 toward the first frame member 30a from the right side to the left side in FIG. 3, to thereby adjust the intervals of adjusting surfaces 63a and 68b with respect to reference surfaces 50a and 90b to be described later. This left-right direction is referred to as an adjusting direction. Regarding the pushing direction, the right side in FIG. 3 is referred to as "pushing origin side", and the left side therein is referred to as "pushing destination side" in some cases.

In this embodiment, the first guiding portions 62a to 62d are formed as grooves that each have planes intersecting with each other at right angles and extend parallel to the optical axis direction. Meanwhile, the second guiding portions 64a to 64d are formed as planes extending in the optical axis direction so as to be opposed to the first guiding portions 62a to 62d, respectively, at an angle of, for example, 45 degrees.

Further, in the guiding mechanisms 52b and 52c on the pushing origin side, the first frame member 30a has first regulating surfaces 66b and 66c formed so as to be opposed to the balls 24b and 24c, respectively, and the second frame member 30b has the adjusting surfaces 68a and 68b formed therein. Further, the lens support 22 has first buffering surfaces 88a and 83b formed therein. Further, in the guiding mechanisms 52a and 52d on the pushing destination side, the first frame member 30a has the reference surfaces 90a and 90b and second regulating surfaces 32a and 92b formed therein. Further, the lens support 22 has second buffering surfaces 94a and 94b formed therein. The adjusting surfaces 68a and 68b are formed at an angle intersecting with the first regulating surfaces 66a and 66b, for example, at 90 degrees. Further, the second regulating surfaces 92a and 92b are formed at an angle intersecting with the reference surfaces 90a and 90b, for example, at 90 degrees. Further, the first buffering surfaces 88a and 88b and the second buffering surfaces 94a and 94b are formed at, for example, 45 degrees with respect to the adjusting direction.

The positions (intervals) of the adjusting surfaces 68a and 68b with respect to the reference surfaces 30a and 30b in the pushing direction are adjusted by moving the second frame member 30b to the left side in FIG. 3 when the lens driving device 10 is manufactured. Thus, in the respective guiding mechanisms 52a to 52d, the intervals among the first guiding portions 62a to 62d, the balls 24a to 24d, and the second guiding portions 64a to 64d can be appropriately adjusted. In this embodiment, the first guiding portions 62a to 62d and the second guiding portions 64a to 64d abut against the upper and lower balls of the sets of balls 24a to 24d, and the center balls of the sets of balls 24a to 24d, which are formed slightly smaller than the upper and lower balls, form slight gaps with the first guiding portions 62a to 62d and the second guiding portions 64a to 64d.

Figure 4:
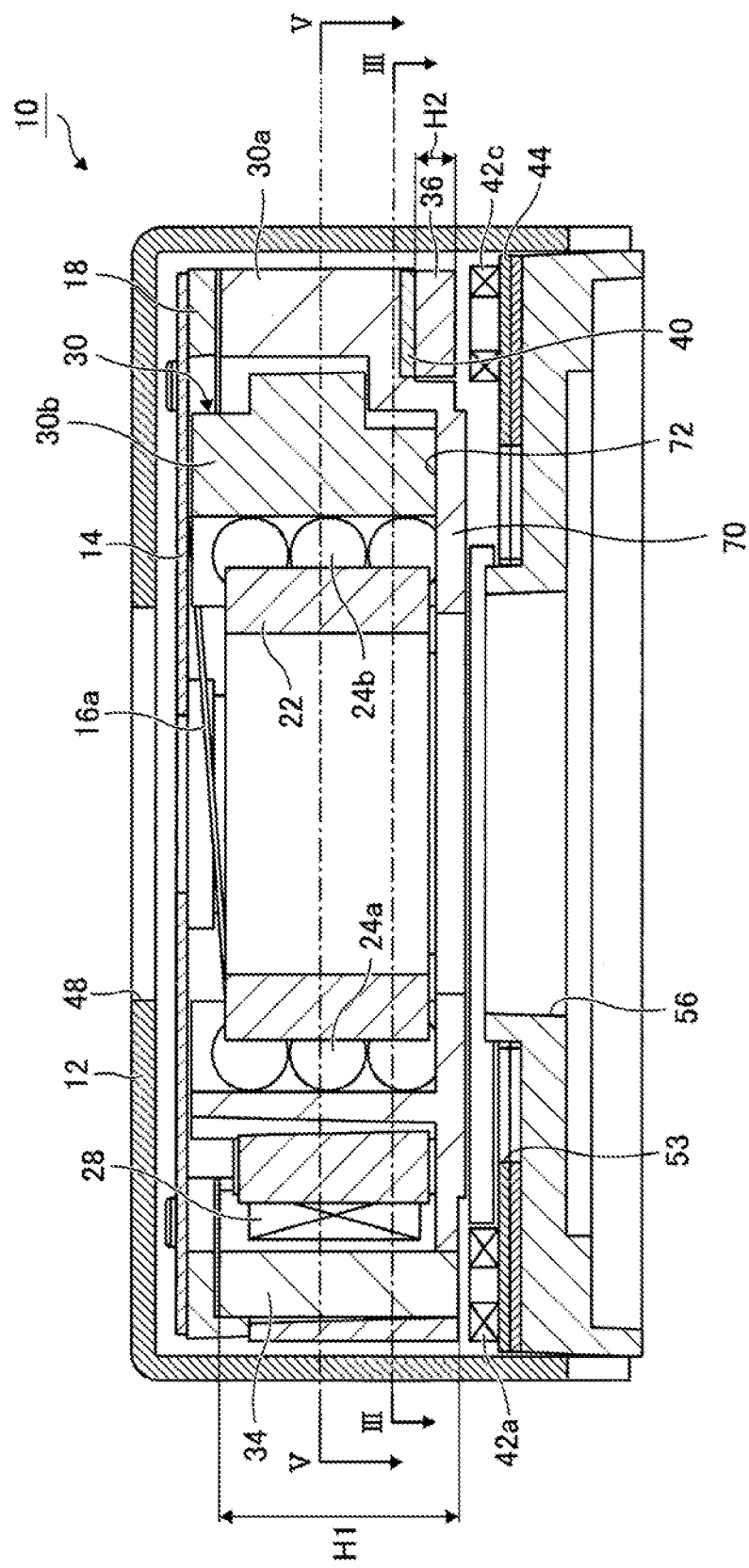
FIG. 4 is a sectional view taken along the line IV-IV of FIG. 3 for illustrating the lens driving device according to the embodiment of the present invention.

As illustrated in FIG. 4, a bottom portion 70 of the first frame member 30a extends toward the center of the lens support 22, and the upper surface of the bottom portion 70 forms a placing plane portion 72. The placing plane portion 72 forms a surface orthogonal to the optical axis direction. The lower surface of the second frame member 30b abuts against the placing plane portion 72. When the lens driving device 10 is manufactured, the lower surface of the second frame member 30b slides on the placing plane portion 72 of the first frame member 30a so that the second frame member 30b can be moved toward the first frame member 30a on the surface orthogonal to the optical axis direction. When the second frame member 30b is moved, as described above, the intervals among the first guiding portions 62a to 62d, the balls 24a to 24d, and the second guiding portions 64a to 64d can be appropriately adjusted.

Now, with reference to FIG. 3, an example of a method of manufacturing the guiding mechanisms 52a to 52d is described. First, the lens support 22 and the second frame member 30b are mounted to the first frame member 30a. At this time, it is preferred that the second frame member 30b and the lens support 22 are arranged relatively on the right side of FIG. 3 to an extent that abutment surfaces 84 of the second frame member 30b and abutment surfaces 86 of the lens support 22 abut against first stopper surfaces 80 and second stopper surfaces 82 of the first frame member 30a, respectively. When the interval between the first stopper surface 80 and the abutment surface 34 is formed larger than the interval between the second stopper surface 82 and the abutment surface 86 in the complete state, the balls 24a to 24d can be easily inserted.

Next, the predetermined balls 24a to 24d are inserted in spaces between the first guiding portions 62a to 62d and the second guiding portions 64a to 64d, and then the second frame member 30b is moved to the left side of FIG. 3. Then, after the adjusting surfaces 68a and 68b of the second frame member 30b abut against the balls 24b and 24c, respectively, the balls 24b abut against three planes of the adjusting surface 68a, the first regulating surface 66a, and the first buffering surface 88a of the second guiding portion 64b, and the balls 24c abut against three planes of the adjusting surface 68b, the first regulating surface 66b, and the first buffering surface 88b of the second guiding portion 64c. Even when the second frame member 30b is further moved to the left side, the tails 24b and 24c still abut against the first regulating surfaces 66a and 66b, respectively, and hence the positions of the balls 24b and 24c in the direction orthogonal to the pushing direction are not changed.

When the second frame member 30b is further moved to the left side, the pushing forces from the balls 24b and 24c are received by the first buffering surfaces 88a and 38b such that the lens support 22 is moved to the left side, and the second buffering surfaces 94a and 94b abut against the balls 24a and 24d, respectively. When the second frame member 30b is further moved to the left side, the balls 24a abut against three planes of the reference surface 90a and the second regulating surface 32a forming the first guiding portion 62a and the second buffering surface 94a forming the second guiding portion 64a, and the balls 24d abut against three planes of the reference surface 90b and the second regulating surface 92b forming the first guiding portion 62d and the second buffering surface 94b forming the second guiding portion 64d. The positions of the balls 24a and 24d in the direction orthogonal to the pushing direction are not changed after the balls 24a and 24d abut against the second regulating surfaces 92a and 92b, respectively. Under this state, the balls 24a to 24d each abut against the three planes. Further, under this state, the position of the lens support 22 in the pushing direction and the position thereof in the direction orthogonal to the pushing direction are regulated.

Finally, the second frame member 30b is fixed to the first frame member 30a with use of an adhesive or the like. Alternatively, after the balls 24a to 24d each abut against the three planes, the second frame member 30b is moved back to the right side by a predetermined dimension, for example, 10 μm, and then the second frame member 30b is fixed to the first frame member 30a with use of an adhesive or the like.

In this manner, the intervals among the lens support 22, the frame member 30, and the balls 24a to 24d can be appropriately secured. Therefore, the unsmooth movement of the lens support 22 or the occurrence of backlash can be suppressed, and hence the lens support 22 can be smoothly guided.

As illustrated in FIG. 3 to FIG. 6, the first coil 28 has a configuration in which both sides of two straight line portions are connected by semicircular portions, and is fixed to the lens support 22 such that the two straight line portions are positioned so as to be vertically separated from each other. The first magnet 34 is fixed to the frame member 30 so as to be opposed to the first coil 23, and the first yoke 38 is fixed to the first magnet 34 on the opposite side to the first coil 28. The first magnet 34 is magnetized such that opposite magnetic poles are obtained in the vertical direction, and the two straight line portions of the first coil 28 are opposed to the opposite magnetic poles, respectively. When current is caused to flow through the first coil 28, a magnetic circuit is formed among the first coil 28, the first magnet 34, and the first yoke 38, and an electromagnetic force for moving the lens support 22 in the optical axis direction is generated.

Figure 6:
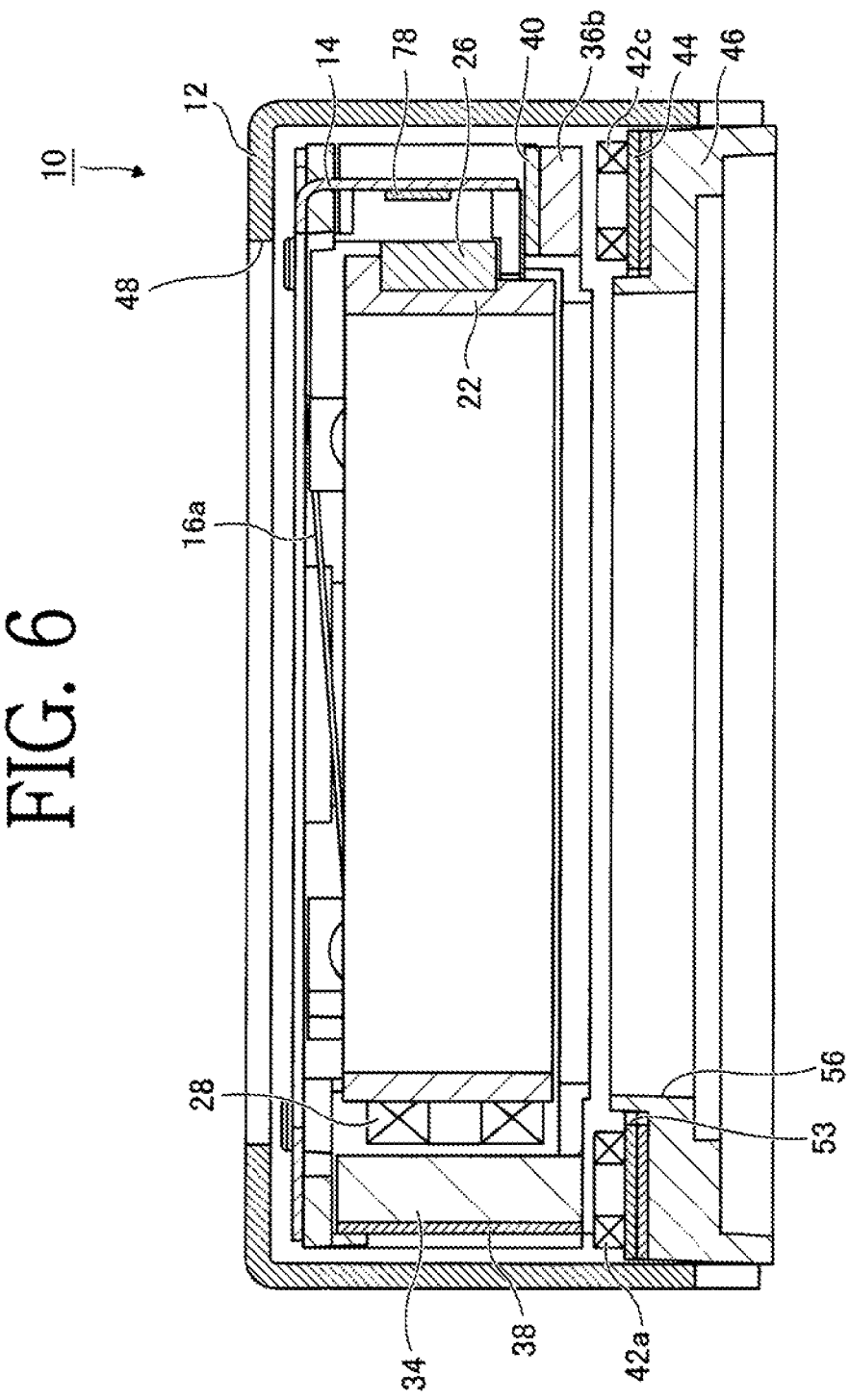
FIG. 6 is a sectional view taken along the line VI-VI of FIG. 5 for illustrating the lens driving device according to the embodiment of the present invention.
Figure 7:
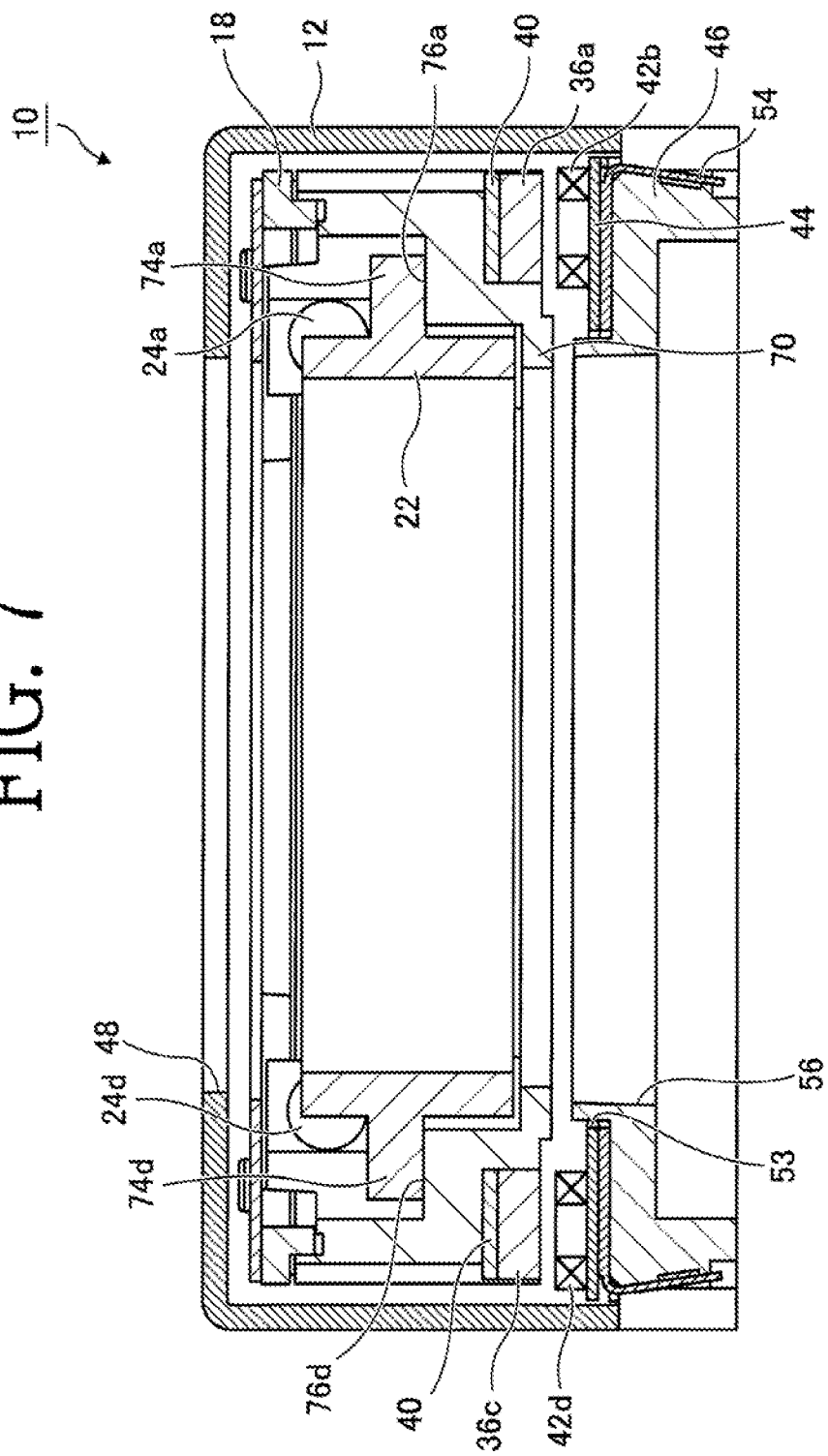
FIG. 7 is a sectional view taken along the line VII-VII of FIG. 5 for illustrating the lens driving device according to the embodiment of the present invention.

As illustrated in FIG. 4, FIG. 6, and FIG. 7, the second coils 42a to 42d are each a laminated coil. The second coils 42a to 42d each have a configuration in which both sides of two straight line portions are connected by semicircular portions, and are fixed to the lower substrate 44 such that the two straight line portions are positioned so as to be separated from each other in the direction orthogonal to the optical axis direction. The one second coil 42a is opposed to the lower surface of the first magnet 34, and the first magnet 34 is magnetized such that the opposing straight line portions of the second coil 42a are opposed to the opposite magnetic poles, respectively. When current is caused to flow through the second coil 42a, a magnetic circuit is formed between the second coil 42a and the first magnet 34, and an electromagnetic force for moving the lens support 22 in the direction orthogonal to the optical axis direction is generated. Further, the second magnets 36a to 36c are fixed to the frame member 30 through intermediation of the second yoke 40 so as to be opposed to the three second coils 42b to 42d, respectively. The second magnets 36a to 36c are magnetized such that the opposing straight line portions of each of the second coils 42b to 42d are opposed to the opposite magnetic poles, respectively. When current is caused to flow through the second coils 42b to 42d, magnetic circuits are formed among the second coils 42b to 42d, the second magnets 36a to 36c, and the second yoke 40, and an electromagnetic force for moving the lens support 22 in the direction orthogonal to the optical axis direction is generated.

As illustrated in FIG. 4 and FIG. 6, a height H2 of each of the second magnets 36a to 36c (width in the optical axis direction) is smaller than a height H1 of the first magnet 34

(width in the optical axis direction). Therefore, the second magnets 36a to 36c can be downsized. Therefore, the weight of the lens driving device 10 can be reduced, and leakage of extra magnetic field lines can be prevented.

As illustrated in FIG. 5 and FIG. 7, the lens support 22 includes, for example, four protruding portions 74a to 74d formed therein. The four protruding portions 74a to 74d are formed on outer peripheral surfaces orthogonal to the side surface on which the first coil 28 is mounted, and are protruded outwardly from the lens support 22. The two protruding portions 74a and 74b and the two protruding portions 74c and 74d are arranged at positions that are line symmetric with respect to the diameter of the lens.

Meanwhile, the frame member 30 includes receiving portions 76a to 76d formed therein so as to be opposed to the protruding portions 74a to 74d of the lens support 22, respectively. The receiving portions 76a to 76d are formed above the above-mentioned bottom portion 70 of the frame member 30. The protruding portions 74a to 74d abut against the receiving portions 76a to 76d, respectively, to thereby regulate the lower position of the lens support 22. With this, the lens support 22 does not abut against the bottom portion 70. As described above, the receiving portions 76a to 76d abutting against the lens support 22 are formed above the bottom portion 70 of the frame member 30, and hence particles generated between the protruding portions 74a to 74d and the receiving portions 76a to 76d are less liable to fall downward. An image sensor is provided below the lens driving device 10, and because the lens driving device 10 has such structure that particles are less liable to fall downward, a risk that the image sensor is contaminated by the particles can be reduced.

As illustrated in FIG. 5 and FIG. 6, a position detector 78 is provided so as to be opposed to the optical axis direction position detecting magnet 26 fixed to the lens support 22. The position detector 78 is formed on a downwardly extending part of the upper substrate 14. When the lens support 22 moves in the optical axis direction, the magnetic flux density from the optical axis direction position detecting magnet 26 changes, and the position detector 78 detects the position of the lens support 22 in the optical axis direction based on the change in magnetic flux density.

The above-mentioned second magnet 36b is arranged below the position detector 78. The second yoke 40 is interposed between the second magnet 36b and the position detector 78. The magnetic flux of the second magnet 36b passes through the second yoke 40 and does not leak on the position detector 78 side, and hence a risk that the position detector 78 is affected by the second magnet 36b can be reduced.

Two position detectors that are each configured to detect the position of the frame member 30 in the direction orthogonal to the optical axis are mounted on the lower substrate 44. One position detector is mounted at a position opposed to any one of the first magnet 34 and the second magnet 36b, and the other position detector is mounted at a position opposed to any one of the second magnet 36a and the second magnet 36c.

The lens is supported by the above-mentioned lens support 22. The lens driving device 10 including the lens support 22 supporting the lens is mounted on a camera device. In the camera device, light input from an object through the lens is detected by the image sensor. The moving amount of the lens for focusing on the object is calculated by a controller included in the camera. The controller controls current corresponding to the moving amount of the lens so as to flow through the first coil 28. When the current flows through the first coil 28, due to the magnetic flux from the first magnet 34, an electromagnetic force for upward or downward movement is generated in the first coil 28. When the electromagnetic force is generated in the first coil 28, the lens moves together with the first coil 28 and the lens support 22, to thereby bring the camera into focus. In this case, the lens support 22 is smoothly guided by the guiding mechanisms 52a to 52d in which the intervals among the first guiding portions 62a to 62d, the balls 24a to 24d, and the second guiding portions 64a to 64d are appropriately adjusted.

Further, when the camera device is caused to shake, the shift direction and amount are detected by a sensor (not shown), and the second coils 42a to 42d are energized to cause an electromagnetic force to be generated in the movable member. In this manner, the movable member is moved in the direction orthogonal to the optical axis direction against the elastic forces of the suspension wires 32a to 32d, to thereby perform image stabilization.

Modified examples of this embodiment are described with reference to FIG. 8A to FIG. 8D. Unlike the above-mentioned example illustrated in FIG. 3A, in the example illustrated in FIG. 8B, the first regulating surfaces 66a and 66b are formed in the second frame member 30b. As long as the position accuracy of the second frame member 30b in the direction orthogonal to the pushing direction can be secured, such structure may be employed. Further, the first regulating surfaces 66a and 66b of the second frame member 30b may be extended to also serve as the second regulating surfaces 32a and 92b.

Figure 8A:
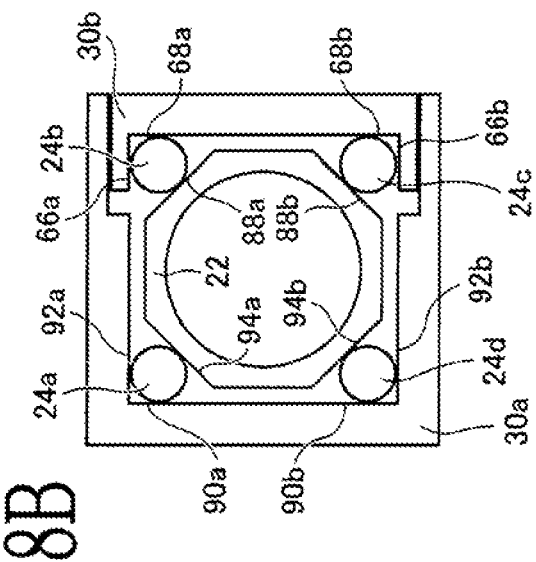
FIG. 8A is a schematic illustration of the lens driving device according to the embodiment of the present invention, and is a view for illustrating the example of FIG. 3.
Figure 8B:
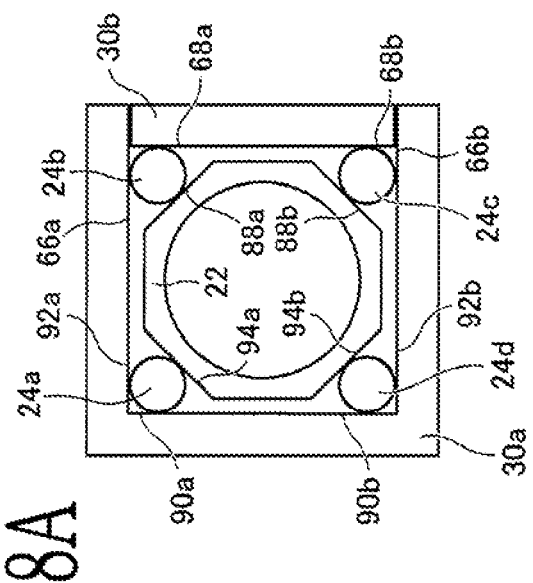
FIG. 8B is a view of a modified example of the lens driving device of FIG. 8A.
Figure 8C:
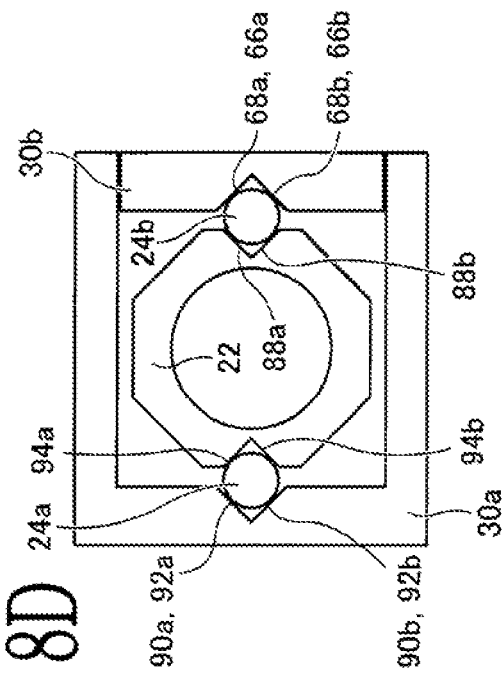
FIG. 8C is a view of another modified example thereof.

Further, as illustrated in FIG. 8C, the guiding mechanisms 52b and 52c on the pushing origin side may be collected into one at an intermediate position therebetween. In this case, a V-groove is formed of two planes at a center portion of the second frame member 30b. The two planes respectively serve as the adjusting surfaces 68a and 68b for pushing and moving the balls 24b and 24c, and the first regulating surfaces 66a and 66b for regulating the positions of the balls 24b and 24c in the direction orthogonal to the pushing direction. Further, in the lens support 22 at a position opposed to the V-groove, a V-groove is formed of two planes reversely. The two planes of the lens support 22 are the first buffering surfaces 88a and 38b, which receive the pushing force through intermediation of the balls 24b and regulate the position of the lens support 22 in the direction orthogonal to the pushing direction. The number of the balls 24a to 24d is reduced, and hence the cost can be reduced.

Figure 8D:
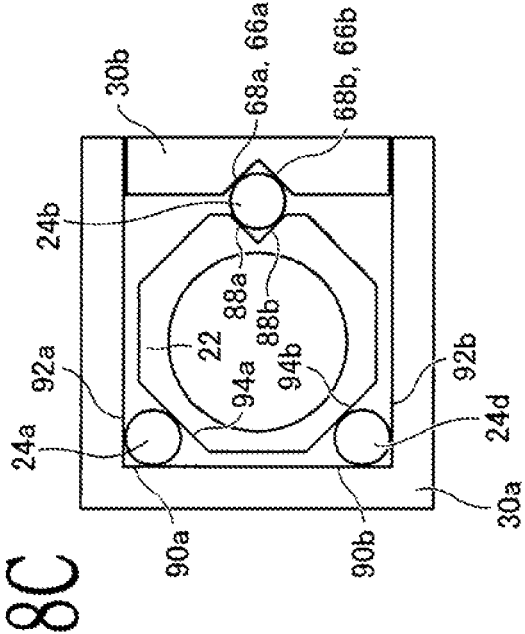
FIG. 8D is a view of further another modified example thereof.

Further, as illustrated in FIG. 8D, the guiding mechanisms 52a and 52a on the pushing destination side may be collected into one at an intermediate position therebetween. In FIG. 8D, the guiding mechanism on the pushing origin side employs the same guiding mechanism as FIG. 8C, but may employ the same guiding mechanism as FIG. 8A or FIG. 8B. In FIG. 8D, a V-groove is formed of two planes at the center portion of the lens support 22. The two planes are the second buffering surfaces 94a and 94b, which push the balls 24a and regulate the position of the lens support 22 in the direction orthogonal to the pushing direction. Further, in the first frame member 30a at a position opposed to the V-groove, a V-groove is formed of two planes reversely. The two planes of the first frame member 30a respectively serve as both of the reference surfaces 90a and 90b for receiving the pushing force through intermediation of the balls 24a and being a reference of the position of the balls 24a in the pushing direction, and the second regulating surfaces 92a and 92b for regulating the position of the balls 24a in the direction orthogonal to the pushing direction. The number of the balls 24a to 24d is reduced, and hence the cost can be reduced.

The lens driving device to be used in the camera device is described herein, but the present invention is also applicable to other devices.

What is claimed is:

1. A lens driving device, comprising:
   a lens support configured to support a lens;
   a frame member surrounding a periphery of the lens support; and
   a plurality of guiding mechanisms configured to guide the lens support relative to the frame member in a freely movable manner,
   each of the plurality of guiding mechanisms comprising:
     a first guiding portion formed in the frame member;
     a second guiding portion formed in the lens support; and
     balls arranged between the first guiding portion and the second guiding portion,
   the frame member comprising a first frame member and a second frame member formed of separate members,
   the first frame member having a reference surface in one of the plurality of guiding mechanisms,
   the second frame member having an adjusting surface opposed to the reference surface, for adjusting an interval to the reference surface, in another one of the plurality of guiding mechanisms,
   the lens support being arranged between the reference surface and the adjusting surface through intermediation of the balls, wherein
   the second guiding portion of the one of the plurality of guiding mechanisms having the reference surface includes a buffering surface forming a predetermined angle with respect to the direction of the adjusting, and
   the first guiding portion of the one of the plurality of guiding mechanisms having the reference surface includes the reference surface of the one of the plurality of guiding mechanisms and a regulating surface for regulating a position of the balls in the direction orthogonal to the direction of the adjusting.

2. A lens driving device according to claim 1,
   wherein the first guiding portion of the another one of the plurality of guiding mechanisms having the adjusting surface comprises the adjusting surface and a first regulating surface for regulating a position of the balls of the another one of the plurality of guiding mechanisms in a direction orthogonal to a direction of the adjusting,
   wherein the second guiding portion of the another one of the plurality of guiding mechanisms having the adjusting surface comprises a first buffering surface forming a predetermined angle with respect to the direction of the adjusting,
   wherein the second guiding portion of the one of the plurality of guiding mechanisms having the reference surface comprises the said buffering surface that is a second buffering surface forming a predetermined angle with respect to the direction of the adjusting, and
   wherein the first guiding portion of the one of the plurality of guiding mechanisms having the reference surface comprises the reference surface of the one of the plurality of guiding mechanisms and the said regulating surface that is a second regulating surface for regulating a position of the balls in the direction orthogonal to the direction of the adjusting.

3. A lens driving device according to claim 1, wherein the frame member comprises a plane having a surface orthogonal to the optical axis direction on which surface the second frame member is placed.

4. A lens driving device according to claim 1, further comprising:
   a first magnet mounted to the frame member;
   a first coil mounted to the lens support so as to be opposed to the first magnet; and
   a pair of conductive wires that couples between the frame member and the lens support in a cantilever state and is configured to supply power to the first coil.

5. A lens driving device according to claim 4, wherein the pair of conductive wires is formed line symmetric with respect to a lens diameter.

6. A lens driving device according to claim 1, further comprising:
   a base configured to support the frame member in a freely movable manner in a direction orthogonal to an optical axis of the lens;
   a first magnet mounted to the frame member;
   a first coil mounted to the lens support so as to be opposed to the first magnet;
   a second magnet mounted to the frame member; and
   a second coil mounted to the base so as to be opposed to the second magnet,
   wherein the second magnet has a width in the optical axis direction that is smaller than a width in the optical axis direction of the first magnet.

7. A lens driving device according to claim 6,
   wherein the second coil comprises a plurality of second coils, and
   wherein one of the plurality of second coils is opposed to the first magnet.

8. A lens driving device according to claim 1,
   wherein the lens support comprises a protruding portion outwardly protruding from an outer peripheral surface of the lens support, and
   wherein the protruding portion abuts against a receiving portion formed at a position higher than a position of a bottom portion of the frame member.

9. A lens driving device according to claim 1, further comprising:
   a position detecting magnet mounted to the lens support;
   a position detector mounted to the frame member and configured to detect a position of the lens support in the optical axis direction;
   a second magnet mounted to the frame member;
   a second coil mounted so as to be opposed to the second magnet; and
   a yoke arranged between the position detector and the second magnet.

10. A camera device, comprising:
    the lens driving device of claim 1;
    a lens supported by the lens support; and
    an image sensor configured to receive light from the lens.

11. An electronic apparatus, comprising the camera device of claim 10.

12. A lens driving device according to claim 1,
    wherein the at least one of the plurality of guiding mechanisms has:
    the first guiding portion being formed with use of the first frame member and the second frame member;
    the second guiding portion; and
    the balls, wherein
    the balls contact with: the regulating surface of the first frame member which regulating surface expands parallel with respect to an optical axis direction of the lens; the adjusting surface of the second frame member which adjusting surface expands parallel with respect to the optical axis direction; and the second guiding portion.

13. A lens driving device according to claim 1,
wherein the plurality of guiding mechanisms include two guiding mechanisms formed on both sides of the lens support, and
wherein the first guiding portion of each of the two guiding mechanisms comprises an adjusting surface formed in the second frame member, for adjusting a position of the balls, and a regulating surface formed in the first frame member, for regulating the position of the balls in a direction intersecting with a direction of the adjusting.

* * * * *